(12) United States Patent
Flowers (10) Patent No.: US 8,132,634 B1
(45) Date of Patent: Mar. 13, 2012

(54) ELECTRONIC STEERING ASSEMBLY FOR DUAL MOTOR VEHICLE

(75) Inventor: Michael J. Flowers, Mantua, NJ (US)

(73) Assignee: Flowers IP LLC, Mantua, NJ (US)

( * ) Notice: Subject to any disclaimer, the term of this patent is extended or adjusted under 35 U.S.C. 154(b) by 79 days.

(21) Appl. No.: 12/460,843

(22) Filed: Jul. 24, 2009

Related U.S. Application Data (60) Provisional application No. 61/135,851, filed on Jul. 24, 2008.

(51) Int. Cl.
  *B62D 1/22* (2006.01)
  *B62D 11/04* (2006.01)
  *B60K 26/00* (2006.01)
  *A61G 5/04* (2006.01)

(52) U.S. Cl. ........ 180/6.5; 180/19.3; 180/321; 180/326; 180/907; 280/304.1

(58) Field of Classification Search .................... 180/6.5, 180/6.48, 19.3, 78, 320, 321, 323, 326, 334, 180/907; 280/304.1
See application file for complete search history.

(56) References Cited

U.S. PATENT DOCUMENTS

| | | | | |
|---|---|---|---|---|
| 2,567,065 | A | * | 9/1951 | Ginsterblum ................. 180/216 |
| 5,201,380 | A | * | 4/1993 | Callahan ....................... 180/403 |
| 5,435,404 | A | * | 7/1995 | Garin, III ....................... 180/6.5 |
| 5,727,642 | A | * | 3/1998 | Abbott ........................... 180/65.1 |
| 5,927,414 | A | * | 7/1999 | Kan et al. ...................... 180/19.3 |
| 6,341,657 | B1 | * | 1/2002 | Hopely et al. ................. 180/6.5 |
| 6,684,969 | B1 | * | 2/2004 | Flowers et al. .............. 180/65.1 |
| 6,840,340 | B2 | * | 1/2005 | Inoue et al. ................... 180/19.3 |
| 7,046,917 | B1 | * | 5/2006 | Lin ................................. 388/824 |
| 2002/0011361 | A1 | * | 1/2002 | Richey et al. ................. 180/6.5 |
| 2004/0007401 | A1 | * | 1/2004 | Chu et al. ........................ 180/13 |
| 2004/0216550 | A1 | * | 11/2004 | Fallak et al. ................. 74/551.9 |
| 2005/0151334 | A1 | * | 7/2005 | Flowers et al. ............ 280/47.11 |
| 2008/0115982 | A1 | * | 5/2008 | Lin ................................. 180/13 |

FOREIGN PATENT DOCUMENTS

JP 06099793 A * 4/1994

* cited by examiner

*Primary Examiner* — Paul N Dickson
*Assistant Examiner* — Wesley Potter
(74) *Attorney, Agent, or Firm* — Frijouf, Rust & Pyle P.A.

(57) ABSTRACT

An electronic steering assembly is disclosed for a dual motor vehicle having a first and a second motor for driving a first and a second drive wheel. The electronic steering assembly comprises a handlebar rotatably mounted relative to a base. A sensor senses the rotational position of the handlebar relative to the base. A control is interposed between the sensor and the first and second motors for powering the first and second motors in accordance with the rotational position of the handlebars for steering the dual motor vehicle through the rotational movement of the handlebar.

11 Claims, 12 Drawing Sheets

ELECTRONIC STEERING ASSEMBLY FOR DUAL MOTOR VEHICLE

CROSS-REFERENCE TO RELATED APPLICATIONS

This application claims benefit of U.S. Patent Provisional application No. 61/135,851 filed Jul. 24, 2008. All subject matter set forth in provisional application 61/135,851 filed Jul. 24, 2008 is hereby incorporated by reference into the present application as if fully set forth herein.

BACKGROUND OF THE INVENTION

1. Field of the Invention

This invention relates to electric and hydraulic vehicles and more particularly to a dual motor vehicle having an improved electronic steering and control assembly.

2. Description of the Related Art

Personal mobility vehicles may be characterized as either scooter type personal mobility vehicles or powerchair type personal mobility vehicles. Each of the scooter type personal mobility vehicles and the powerchair type personal mobility vehicles have certain advantages and disadvantages.

A scooter type personal mobility vehicle typically comprises an elongated frame having front single or plural steering wheels and plural rear drive wheels. The front single or plural steering wheels are pivotably mounted on the front portion of the elongated frame. A handlebar is provided for pivoting the front single or plural steering wheels for steering the personal mobility vehicle.

The plural rear wheels are mounted on independent axially aligned shafts driven by a single electric motor though a differential gearbox. The electric motor is controlled by a electronic controller and a speed, braking and forward/reverse engager located on the handlebar of the scooter. The scooter type personal mobility vehicle is well suited for unconfined areas such as outside use due to the superior ride of the elongated wheelbase of the scooter. The elongated wheelbase provides more stability and a better ride for the scooter type personal mobility vehicle.

A powerchair type personal mobility vehicle typically comprises a short frame having plural drive wheels and plural caster wheels. The plural drive wheels may be located in the front, center or the rear drive of the powerchair type personal mobility vehicle. Plural caster wheels complement the plural drive wheels of the powerchair type personal mobility vehicle.

The plural drive wheels are independently driven by plural electric motors. Each of the plural electric motors is independently controlled by a dual motor controller for independently driving the plural electric motors.

Typically, a joystick is mounted on an armrest of a powerchair type personal mobility vehicle for controlling the first and second drive motors. The joystick operates both the steering as well as the speed, braking and forward/reverse movements of the powerchair. The steering of the powerchair is accomplished by a differential in speed between the plural independently driven electric motors including the reverse rotation of one of the electric motors relative to the other of the electric motors to turn the powerchair. The powerchair type personal mobility vehicle is well suited for confined areas such as inside use due to the short frame and the superior turning radius of the plural independently driven electric motors. The short wheelbase and the ability to reverse one motor relative to the other motor provides a reduced turning radius for the personal mobility vehicle for negotiating smaller confined spaces indoors.

The basic commands for driving both types of personal mobility vehicles are: go forward or backward; turn left or turn right; go faster or slower; and stop. Unfortunately, the manipulation of a joystick of a powerchair to control the multiple functions of steering, propulsion and braking is not intuitive or obvious to a new user or a cognitively impaired user.

Many new users find it difficult to operate a powerchair type personal mobility vehicle due to the lack of prior experience using a single interface joystick device that combines steering, turning, speed, braking and forward/reverse controls. In contrast, the manipulation of the handlebar in a scooter type personal mobility vehicle with independent drive controls is intuitively obvious to a new user due to past experience operating tricycles, bicycles and automobiles with independent steering and drive controls.

Therefore, it is an object of the invention to provide an electronic steering assembly with independent drive controls for a dual motor vehicle that separates the physical movements necessary to drive a dual motor vehicle so it is intuitively obvious to a new user or a cognitively impaired user.

Another object of the invention is to provide an electronic steering assembly with independent drive controls for a dual motor vehicle that replaces the conventional joystick in a powerchair type personal mobility vehicle.

Another object of the invention is to provide an electronic steering assembly with independent drive controls for a dual motor vehicle that is applicable to any type of electric or hydraulic vehicle having plural drive wheels independently driven by plural electric motors.

Another object of the invention is to provide an electonic steering assembly with independent drive controls for a dual motor vehicle that is applicable to either a powerchair type personal mobility vehicle or a scooter type personal mobility vehicle.

Another object of the invention is to provide an electronic steering assembly with independent drive controls for a dual motor vehicle that is applicable to either a powerchair type personal mobility vehicle or a scooter type personal mobility vehicle that may be operated by an attendant controlling the dual motor vehicle while walking behind the dual motor vehicle with an occupant therein.

Another object of the invention is to provide an electronic steering assembly with independent drive controls for a dual motor vehicle that is applicable to a platform type vehicle that may be operated by a person when standing on the platform.

Another object of the invention is to provide a steering assembly for an electric vehicle that may replace a joystick on existing powerchair type personal mobility vehicles.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an electronic steering assembly with independent drive controls for a dual motor vehicle having a first and a second motor for driving a first and a second drive wheel. The electronic steering assembly comprises a base for mounting to the dual motor vehicle. A handlebar is rotatably mounted relative to the base. A sensor senses the rotational position of the handlebar relative to the base to steer the dual motor vehicle. An independent separately operated sensor controls speed, braking and forward/reverse of the dual motor vehicle. An electronic controller is interposed between the multiple sensors and the first and second motors for powering a first drive wheel relative to a second drive wheel in accordance with the independent positions of the multiple sensors to steer, drive and brake the dual motor vehicle. The electronic steering assembly with independent drive controls for a dual motor vehicle of the present invention may be adapted to a powerchair type personal mobility vehicle or a scooter type personal mobility vehicle as well as other dual motor vehicles.

In a more specific embodiment, the base may be adapted to be mounted relative to a frame of the dual motor vehicle or to be mounted relative to a seat of the dual motor vehicle. In one example, the base is mounted in front of a seat of the dual motor vehicle for enabling an occupant to control the dual motor vehicle. In another example, the base may be adapted to be mounted to an armrest of a seat of the dual motor vehicle. In still a further example, the base is mounted behind a seat of the dual motor vehicle for enabling an attendant to control the dual motor vehicle. Preferably, an adjuster section is provided for adjusting the position of the handlebar relative to the seat of the dual motor vehicle.

In another embodiment of the invention, the invention relates to a steering assembly for a dual motor vehicle, the dual motor vehicle having a first and a second motor for driving a first and a second drive wheel. The steering assembly comprises a base for mounting to the dual motor vehicle. A handlebar is rotatably mounted relative to the base. A sensor senses the rotational position of the handlebar relative to the base. A control is interposed between the sensor and the first and second motors for powering the first motor relative to the second electric motor in accordance with the rotational position of the handlebars for steering the dual motor vehicle. Preferably, the first and second motors are electric motors.

In still a further embodiment of the invention, the invention relates to a steering assembly for a dual motor vehicle having a first and a second motor for driving a first and a second drive wheel. The steering assembly comprises a base for mounting to the dual motor vehicle.

A handlebar control is rotatably mounted relative to the base. A first sensor senses the rotational position of the handlebar relative to the base. A speed/braking control controls the speed and braking of the dual motor vehicle. A second sensor senses the position of the speed/braking control. A controller is interposed between the first and second sensors and the first and second motors for powering the first motor relative to the second motor in accordance with the rotational position of the handlebars for steering the dual motor vehicle and in accordance with the position of the speed/braking control for operating the dual motor vehicle.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

FIGS. 1-4 are various views of a dual motor vehicle 5 incorporating an improved steering and control assembly 10 of the present invention. In this embodiment, the dual motor vehicle 5 is shown as an electric powerchair type personal mobility vehicle. However, it should be understood that the present invention may be applied to any type of dual motor vehicle with joystick controls such as a floor scrubber, platform lift and the like.

The personal mobility vehicle 5 comprises a frame 20 extending between a first frame end 21 and a second frame end 22. The first frame end 21 and the second frame end 22 define an intermediate frame portion 23 of the frame 20. The frame 20 of the personal mobility vehicle 5 is covered by a covering 25 for overlaying interior portions of the personal mobility vehicle 5 and for enhancing the attractiveness of the personal mobility vehicle 5.

Figure 4:
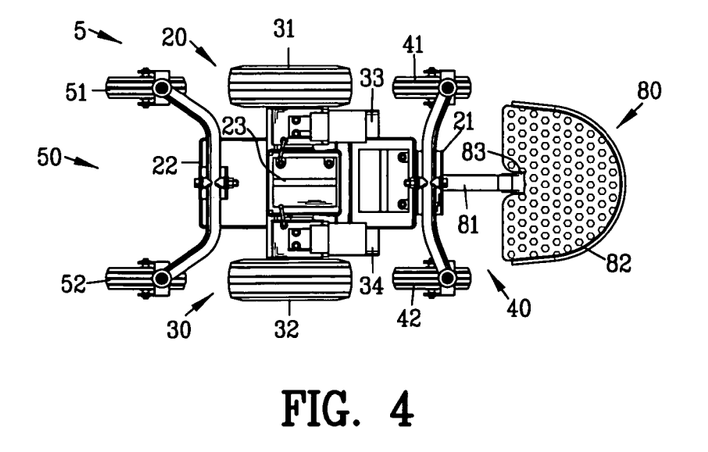
FIG. 4 is a bottom view of FIG. 1.

As best shown in FIG. 4, the personal mobility vehicle 5 comprises a drive wheel assembly 30 having a right and a left drive wheel 31 and 32 located in proximity to the intermediate frame portion 23 of the frame 20. A first and a second electric motor 33 and 34 drive the right and left drive wheels 31 and 32.

A front caster wheel assembly 40 is located in proximity to the first frame end 21 of the frame 20. The front caster wheel assembly 40 comprises a right and a left caster wheel 41 and 42. The right and left caster wheels 41 and 42 are shown as right and left caster wheels mounted by swivels to the first frame end 21 of the frame 20.

A rear caster wheel assembly 50 is located in proximity to the second frame end 22 of the frame 20. The rear caster wheel assembly 50 comprises a right and a left caster wheel 51 and 52. The right and left caster wheels 51 and 52 are shown as right and left caster wheels mounted by swivels to the second frame end 22 of the frame 20.

A pedestal 60 extends from the intermediate frame portion 23 of the frame 20 in a substantially vertical orientation. An upper end of the pedestal 60 extends upwardly for supporting a chair assembly 70.

The chair assembly 70 comprises a chair portion 71 and a backrest portion 72. In this example, the backrest portion 72 is pivotally mounted to the chair portion 71 by a pivot 73 for accommodating for the size and comfort of an occupant. The chair assembly 70 is rotatably mounted on the pedestal 60 with the rotation of the chair assembly 60 being controlled by a lever (not shown). The rotation of the chair assembly 70 facilitates the ingress and egress of an occupant from the personal mobility vehicle 5. Plural armrests 75 and 76 are secured to the chair portion 71 of the chair assembly 70. A rotational chair assembly 70 suitable for use with the present invention is more fully set forth in U.S. Letters Pat. No. 6,361,111 which is incorporated by reference into the present application.

Figure 1:
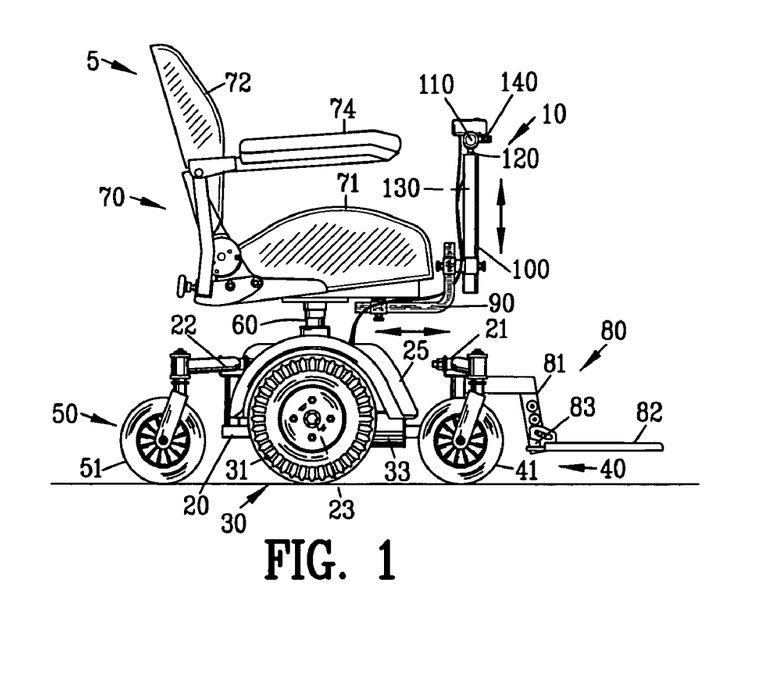
FIG. 1 is a side view of a personal mobility vehicle incorporating an electronic steering assembly with independent drive controls for a dual motor vehicle of the present invention for control by an occupant of the personal mobility vehicle.
Figure 2:
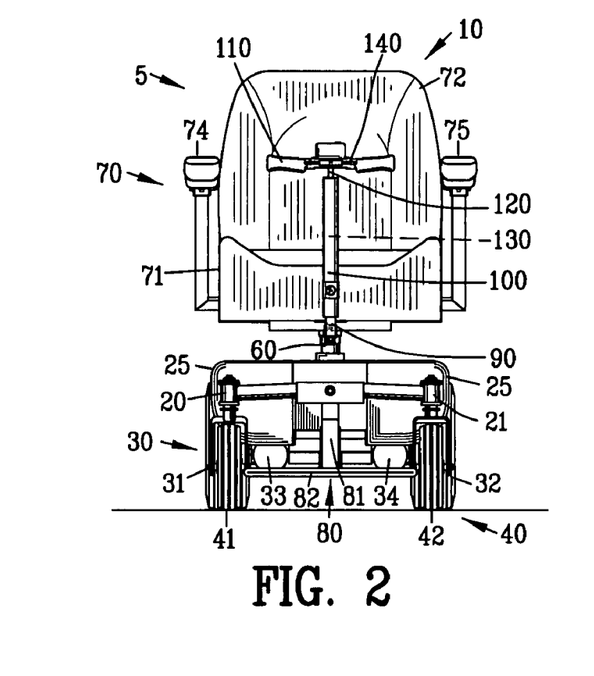
FIG. 2 is a front view of FIG. 1.

A footrest assembly 80 is located on the first end 21 of the frame 20. The footrest assembly 80 comprises a footrest base 81 secured to the first end 21 of the frame 20. A footrest plate 82 mounted to the footrest base 81 by a pivot 83 enabling the footrest plate 82 to be pivoted between a operative position, wherein the first footrest plate 82 is disposed in a generally horizontal position as shown in FIG. 1 and an inoperative position wherein the footrest plate 82 is disposed in a generally vertical position (not shown). The footrest plate 82 provides a footrest for the occupant 70.

FIGS. 5-8 are enlarged views of the electronic steering assembly with independent drive controls for a dual motor vehicle 10 shown in FIGS. 1-4. The electronic steering assembly with independent drive controls for a dual motor vehicle 10 is secured to the personal mobility vehicle 5 for controlling the direction of the personal mobility vehicle 5. In this embodiment, the electronic steering assembly with independent drive controls for a dual motor vehicle 10 comprises a base 90, a rotary coupling 100, a handlebar 110, a rotary sensor 120, and independent drive controls 140 with a separate sensor 143 for controlling speed, braking and forward/reverse. The independent drive control 140 is attached to the handlebar 110. The personal mobility vehicle 5 is steered by turning the handlebar 110 and driven by operating the independent drive control 140. The independent steering 110 and drive control 140 separate the functions of operation of the personal mobility vehicle making it easier to drive.

Figure 5:
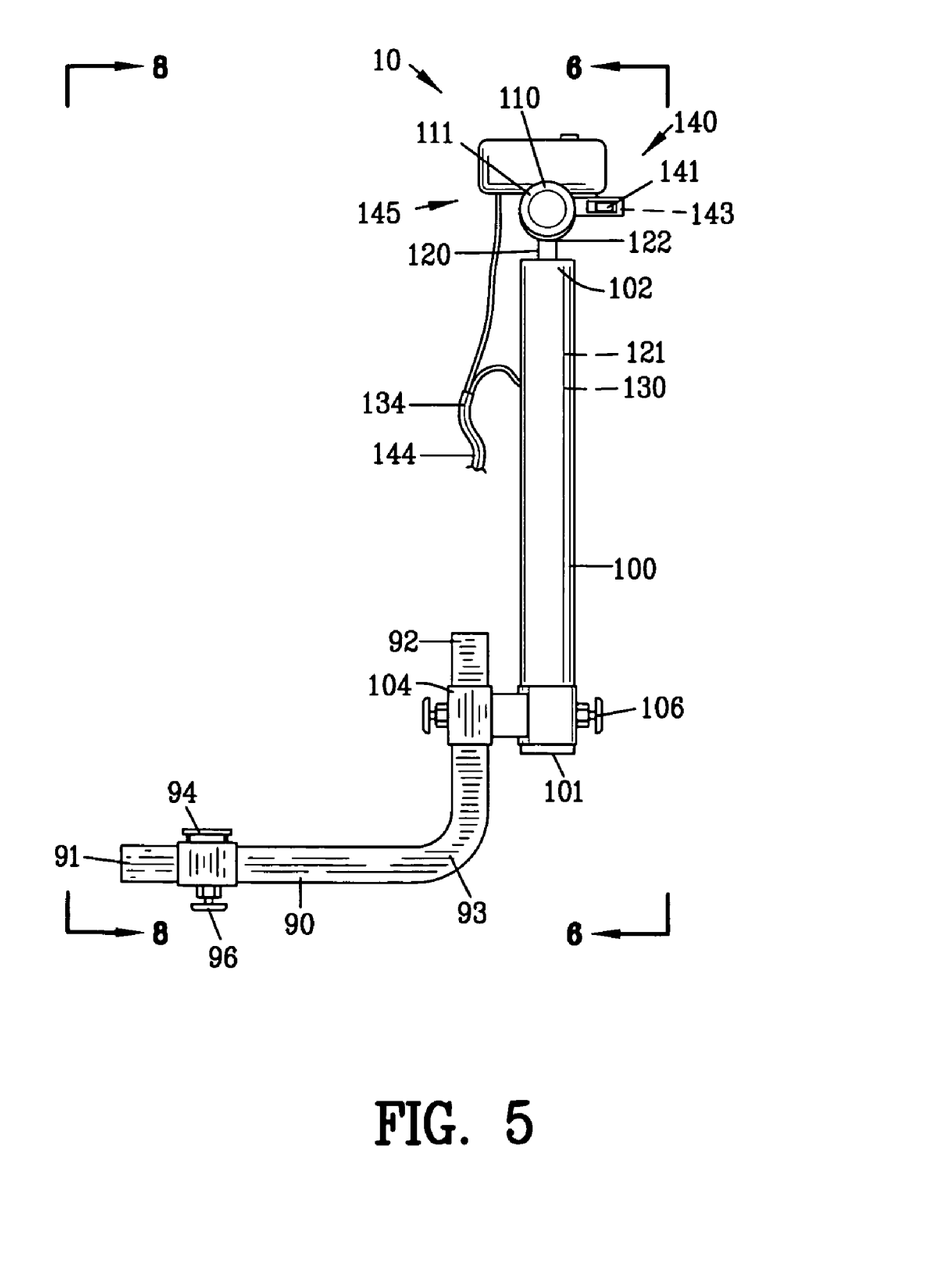
FIG. 5 is an enlarged view of a portion of FIG. 1 illustrating the electronic steering assembly with independent drive controls for a dual motor vehicle of the present invention.
Figure 6:
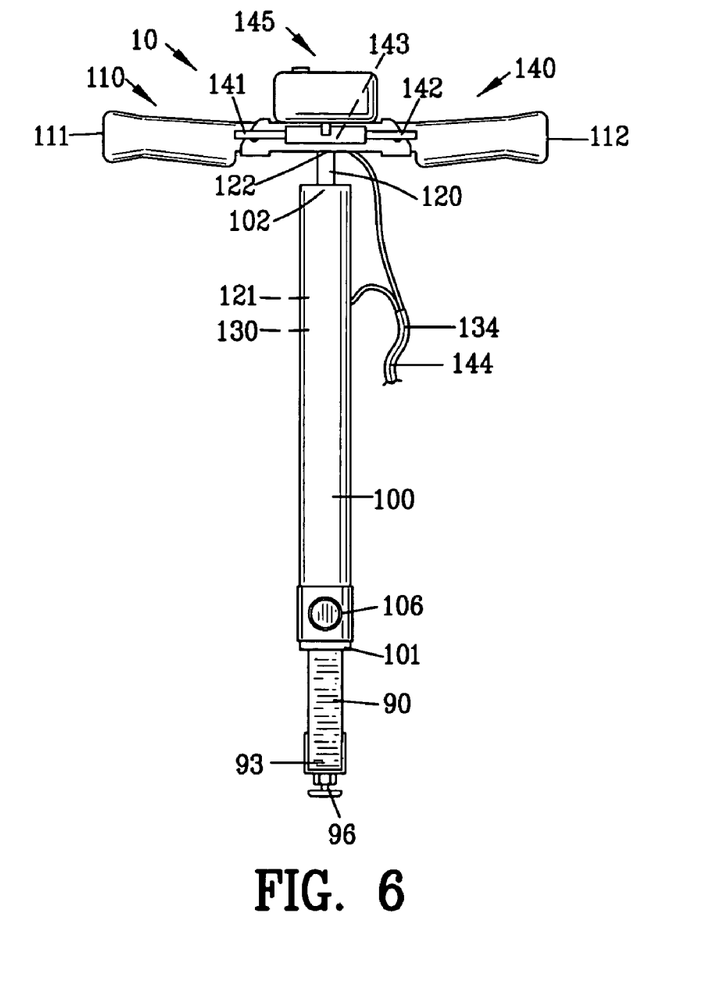
FIG. 6 is a view along line 6-6 in FIG. 5.

FIG. 5 shows the base 90 extends between a first and a second end 91 and 92. A base mounting 94 secures the first end 91 of the base 90 to the personal mobility vehicle 5. In this example, a bend 93 is interposed between the first and second ends 91 and 92 of the base 90 with the base mounting 94 securing the first end 91 of the base 90 to the seat assembly 70 of the personal mobility vehicle 5. In the alternative, the base mounting 94 and the handlebar 110 may be adapted to mount the first end 91 of the base 90 to one of the armrests 75 and 76 of the personal mobility vehicle 5. In a further alternative, the base mounting 94 may be adapted to mount the first end 91 of the base 90 relative to the frame 20 of the personal mobility vehicle 5. In another alternative, the electronic steering assembly 10 and steering sensor 101 and drive controls 140 to operate speed, direction and the braking sensor 143 may be located on individual armrests 75 and 76 of the personal mobility vehicle 5.

Preferably, the base mounting 94 includes a base adjuster 96 for adjusting the position of the second end 92 of the base 90 relative to the personal mobility vehicle 5 as indicated by the arrows in FIG. 1. The base adjuster 96 may include a linear adjustment as indicated by the arrows as well as a rotational adjustment to provide a two dimensional adjustment in a horizontal plane (not shown).

A rotary coupling 100 extends between a lower end 101 and an upper end 102. A coupling mounting 104 secures the lower end 101 of the rotary coupling 100 to the second end 92 of the base 90. Preferably, the coupling mounting 104 includes a coupling adjuster 106 for adjusting the vertical position of the second end 102 of the coupling 100 relative to the personal mobility vehicle 5 as indicated by the arrows in FIG. 1.

The handlebar 110 comprises a right handlebar portion 111 and a left handlebar portion 112. A handlebar stem 120 extends between a lower stem end 121 and an upper stem end 122. The upper stem end 122 is secured to the handlebar 110 intermediated the right and left handlebar portions 111 and 112 with the right and left handlebar portions 111 and 112 extending outwardly therefrom.

The lower stem end 121 of the handlebar stem 120 extends into the upper end 102 of the rotary coupling 100 to be rotatably mounted within the rotary coupling 100. The rotary coupling 100 enables the right and left handlebar portions 111 and 112 to be rotated relative to the base 90 to steer and turn the dual motor vehicle.

Figure 9:
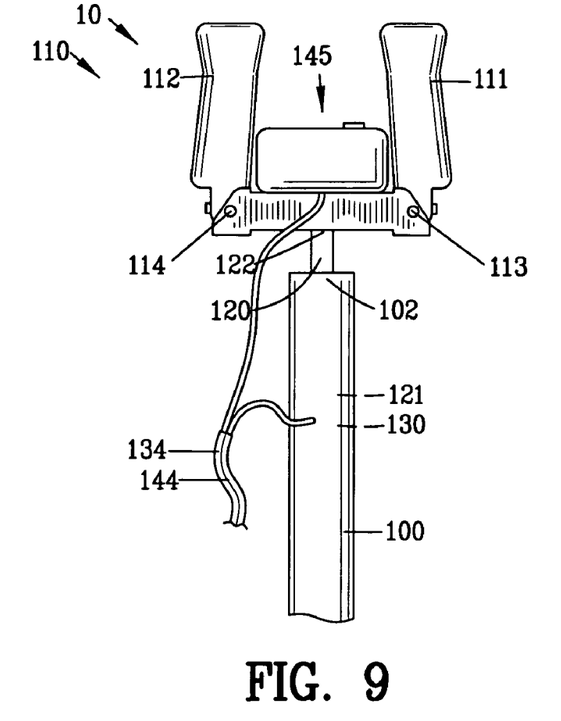
FIG. 9 is an enlarged view of a portion of FIG. 8 in a folded position.
Figure 10:
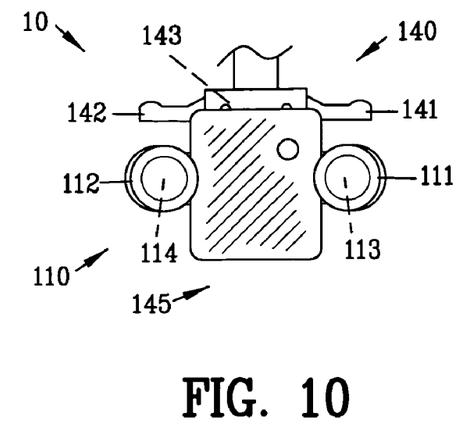
FIG. 10 is a top view of FIG. 9.

FIGS. 9 and 10 illustrate the right handlebar portion 111 and the left handlebar portion 112 in a folded position. A right pivot 113 and a left pivot 114 mount the right handlebar portion 111 and the left handlebar portion 112 to the handlebar 110. The right handlebar portion 111 and the left handlebar portion 112 may be pivoted between an operating position shown in FIGS. 5 and 6 and a folded position shown in FIGS. 9 and 10. The folded position of the right and left handlebar portions 111 and 112 facilitate ingress and egress of an occupant (not shown) of the personal mobility vehicle 5 as well as requiring less space for transportation and storage.

Figure 11:
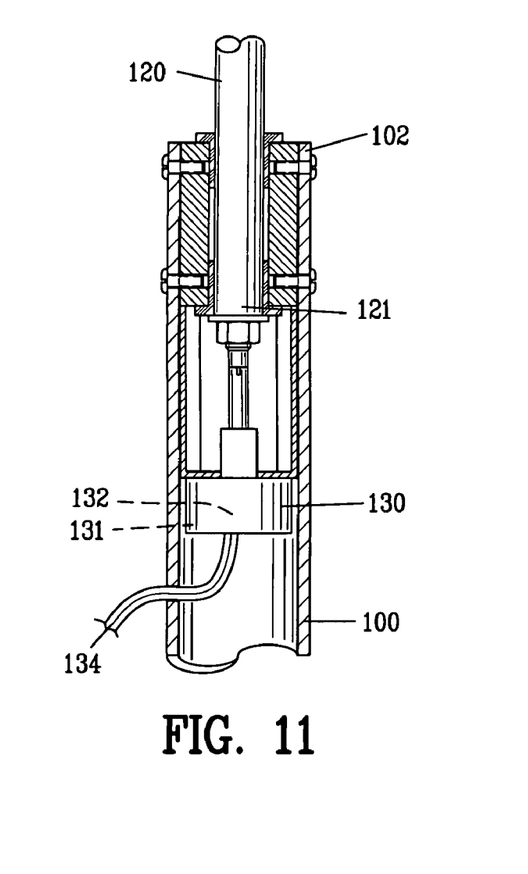
FIG. 11 is an enlarged sectional view along line 11-11 in FIG. 8.

FIG. 11 illustrate a handlebar position sensor 130 located internal to the rotary coupling 100 for sensing the rotational position of the handlebar 110 relative to the base 90 for the purpose of steering and turning the dual motor vehicle. The handlebar position sensor 130 comprises an electrical stator 131 and an electrical rotor 132 with the electrical rotor 132 being rotatable relative to the electrical stator 131. One of the electrical stator 131 and the electrical rotor 132 is fixed relative to the second end 91 of the base 90 with the other of the electrical stator 131 and the electrical rotor 132 being fixed relative to the lower stem end 121 of the handlebar stem 120. The handlebar position sensor 130 provides an electrical signal indicative of the rotational position of the handlebar 110 relative to the base 90. The handlebar position sensor 130 may comprise a potentiometer rotational sensor, a permanent magnetic rotational sensor, a variable inductance rotational sensor, a resolver rotational sensor, a magnetic rotational sensor, a capacitive rotational sensor or a Hall effect rotational sensor.

In this example, the handlebar position sensor 130 comprises a potentiometer stator 131P and a potentiometer rotor 132P with the potentiometer rotor 132P being rotatable relative to the potentiometer stator 131P for the purpose of steering and turning the dual motor vehicle. In this example, the potentiometer stator 131P is affixed relative to the base 90 and the potentiometer rotor 132P is affixed to the lower stem end 121 of the handlebar stem 120 for the purpose of steering and turning the dual motor vehicle.

Figure 7:
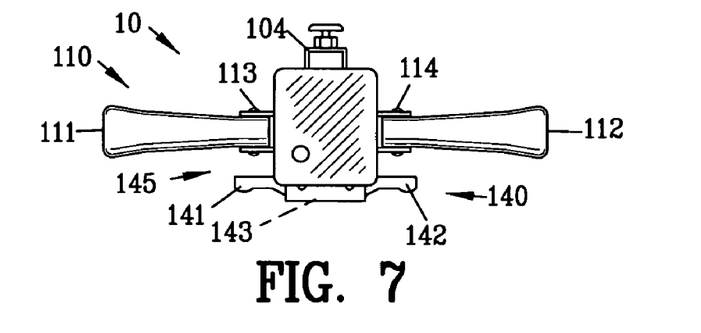
FIG. 7 is a top view of FIG. 6.
Figure 8:
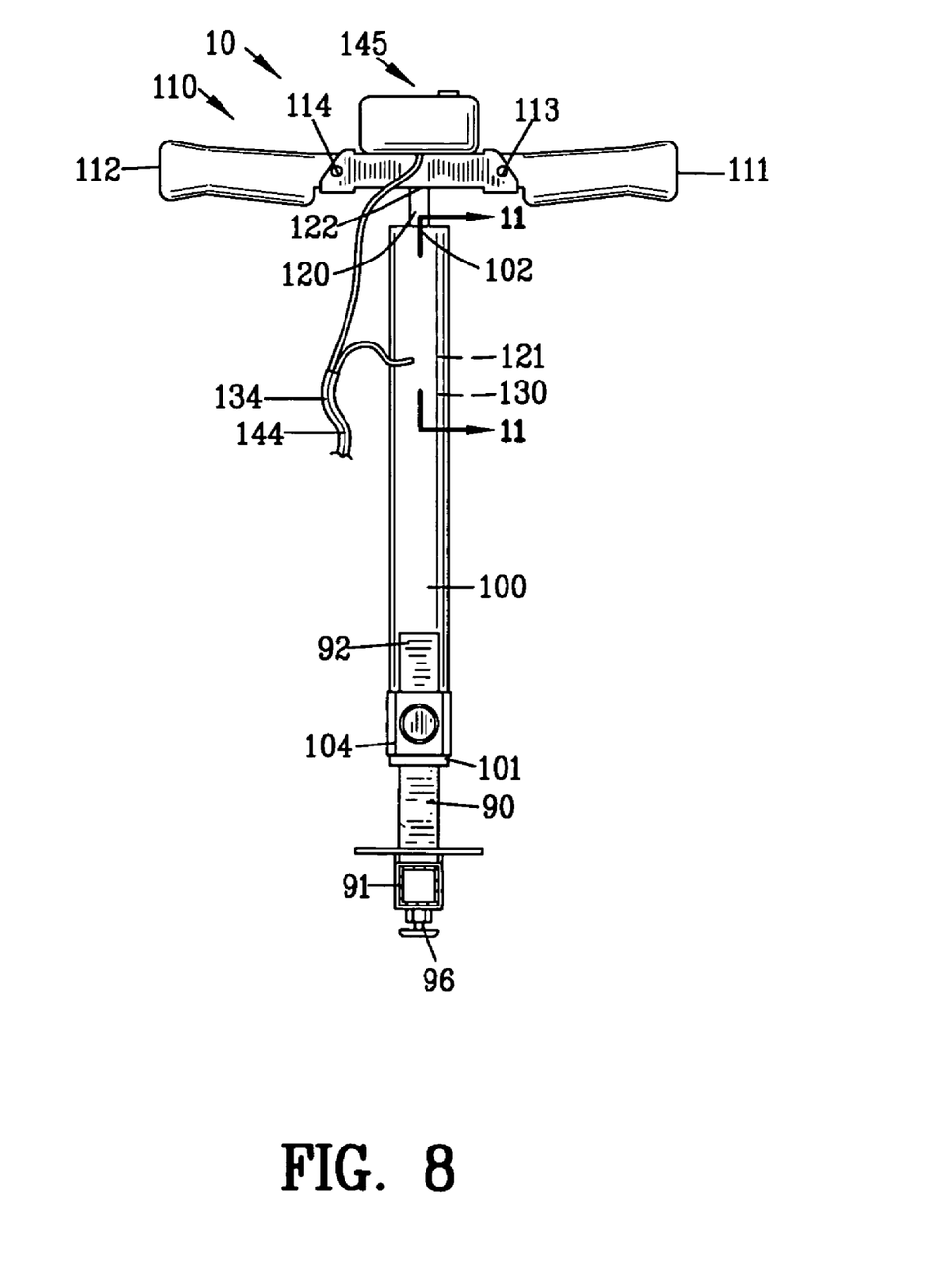
FIG. 8 is a view along line 8-8 in FIG. 5.
Figure 12:
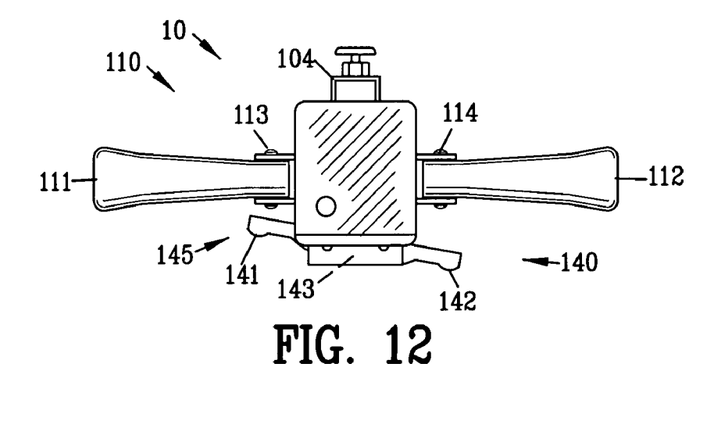
FIG. 12 is a view similar to FIG. 7 with a control lever depressed in first direction.
Figure 13:
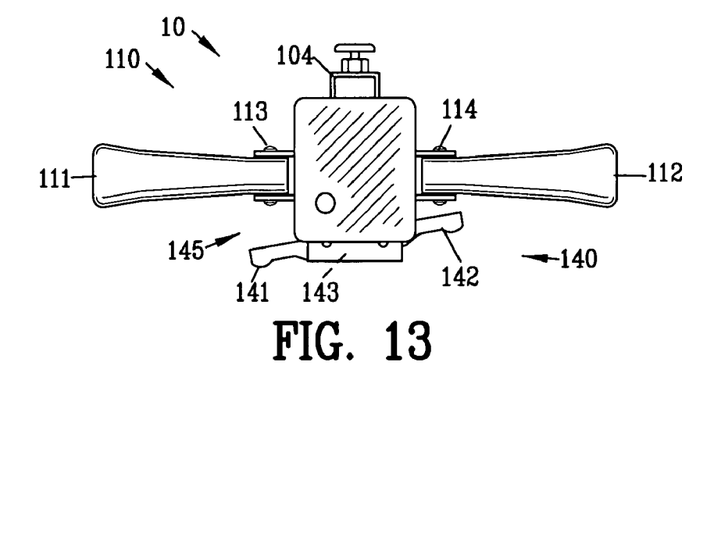
FIG. 13 is a view similar to FIG. 7 with a control lever depressed in second direction.

FIGS. 12 and 13 are enlarged view of FIG. 7 illustrating the operation of a speed, braking and forward-reverse control 140 located on the handlebar 110. The speed, braking and forward-reverse control 140 comprises a forward variable speed control lever 141 and a reverse variable speed control lever 142 which gradually accelerates the dual motor vehicle from zero to full speed when depressed completely. The variable forward/reverse control levers 141 and 142 operate a sensor 143 for providing an electrical output for controlling the variable forward speed, the variable reverse speed as well as a braking function of the first and second electric motors 33 and 34.

FIG. 12 illustrates the depression of the forward variable speed control lever 141 for controlling the variable forward speed of the first and second electric motors 33 and 34W when the control lever 141 is released a spring returns it to its center off position which returns the sensor 143 to its neutral position to signal the dual motor controller 150 to start the sequential engagement process of regenerative braking, dynamic braking and parking brakes.

FIG. 13 illustrates the depression of the reverse variable speed control lever 142 for controlling the variable reverse speed and the braking function of the first and second electric motors 33 and 34W when the control lever 142 is released a spring returns it to its center off position which returns the sensor 143 to its neutral position to signal the dual motor controller 150 to start the sequential engagement process of regenerative braking, dynamic braking and parking brakes. The electrical output of the handlebar position sensor 130 and the speed, braking and forward/reverse control 140 are provided through wires 134 and 144 to an electrical connector plug 146 (not shown).

Figure 14:
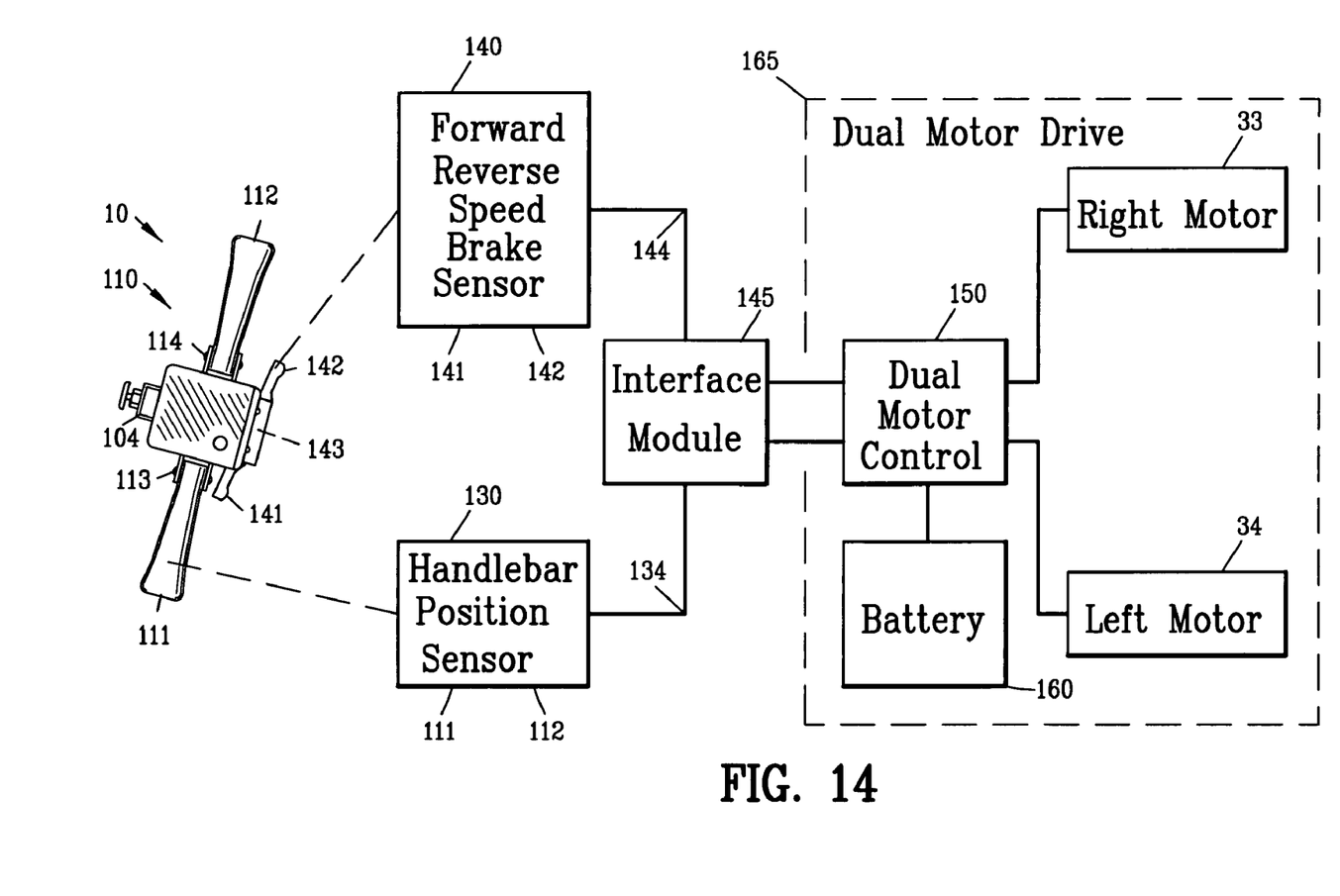
FIG. 14 is a block diagram illustrating the electrical components of the personal mobility vehicle of FIGS. 1-13.

FIG. 14 is a block diagram of the electrical components of the personal mobility vehicle 5 including an interface module 145, a dual motor controller 150 and a battery 160. The handlebar position sensor 130 and the speed, braking and forward/reverse control 140 comprising the forward and the reverse variable speed control levers 141 and 142, drive control sensor 143, and interface 145, are connected through the wires 134 and 144 and the electrical connector plug 146 (not shown) to the dual motor controller 150. The dual motor controller 150 provides electrical power from the battery 160 to the first and second drive motors 33 and 34 in accordance with the outputs of the handlebar position sensor 130 the speed, braking and forward/reverse sensor 143, and interface module 145 to operate the dual motor vehicle. The present invention connects to the dual motor drive 165 through the interface module 145 and the dual motor controller 150.

The handlebar position sensor 130 is connected to the interface module 145 through the wires 134 and 144 and the dual electric motor controller 150 for controlling relative direction of the first and second drive motors 33 and 34 for steering the personal mobility vehicle 5 in accordance with the rotational position of the handlebar 110. The speed, braking and forward/reverse control 140 is connected to the interface module 145 and the dual motor controller 150 for controlling the variable forward speed, the variable reverse speed as well as a three stage sequential braking function of the first and second drive motors 33 and 34.

Figure 3:
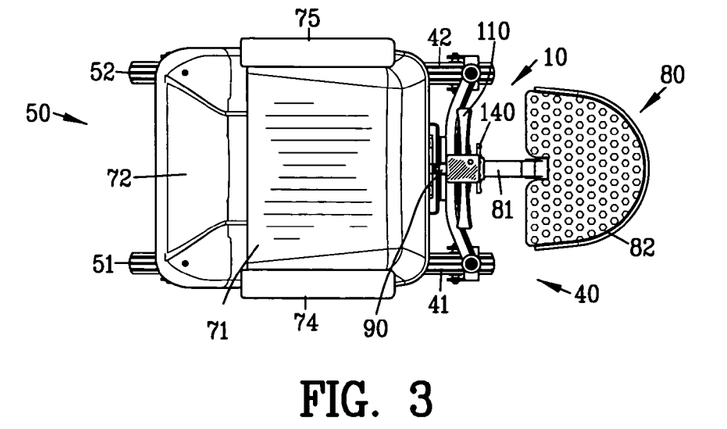
FIG. 3 is a top view of FIG. 1.
Figure 15:
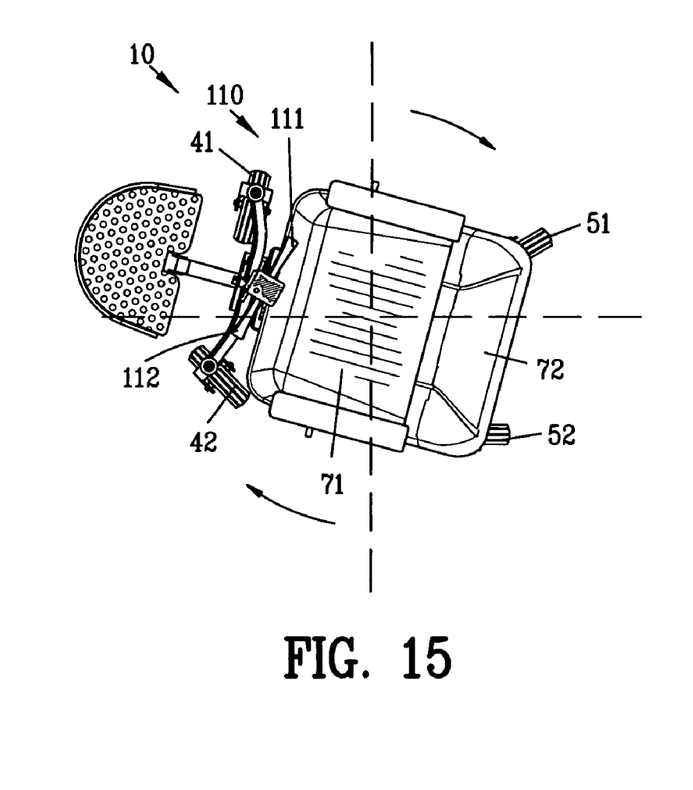
FIG. 15 is a top view similar to FIG. 3 illustrating a right rotation of the steering assembly for steering the personal mobility vehicle toward the right in FIG. 12.

FIG. 15 is a top view similar to FIG. 3 illustrating a right rotation of the electronic steering assembly with independent drive controls for a dual motor vehicle 10 for steering the personal mobility vehicle 5 toward the right in FIG. 12.

Figure 16:
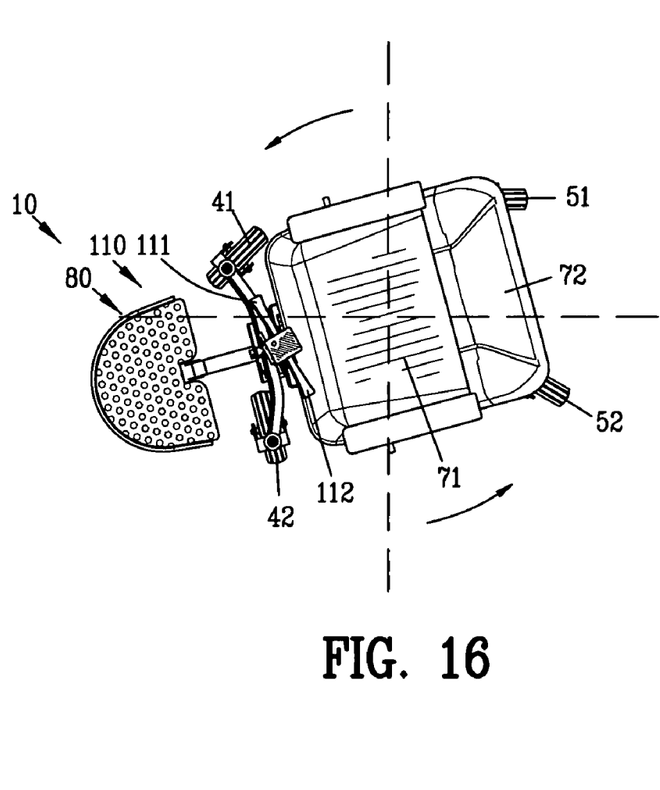
FIG. 16 is a is a top view similar to FIG. 12 illustrating a left rotation of the steering assembly for steering the personal mobility vehicle toward the left in FIG. 13.

FIG. 16 is a top view similar to FIG. 16 illustrating a left rotation of the electronic steering assembly with independent drive controls for a dual motor vehicle 10 for steering the personal mobility vehicle 5 toward the left in FIG. 13.

Figure 17:
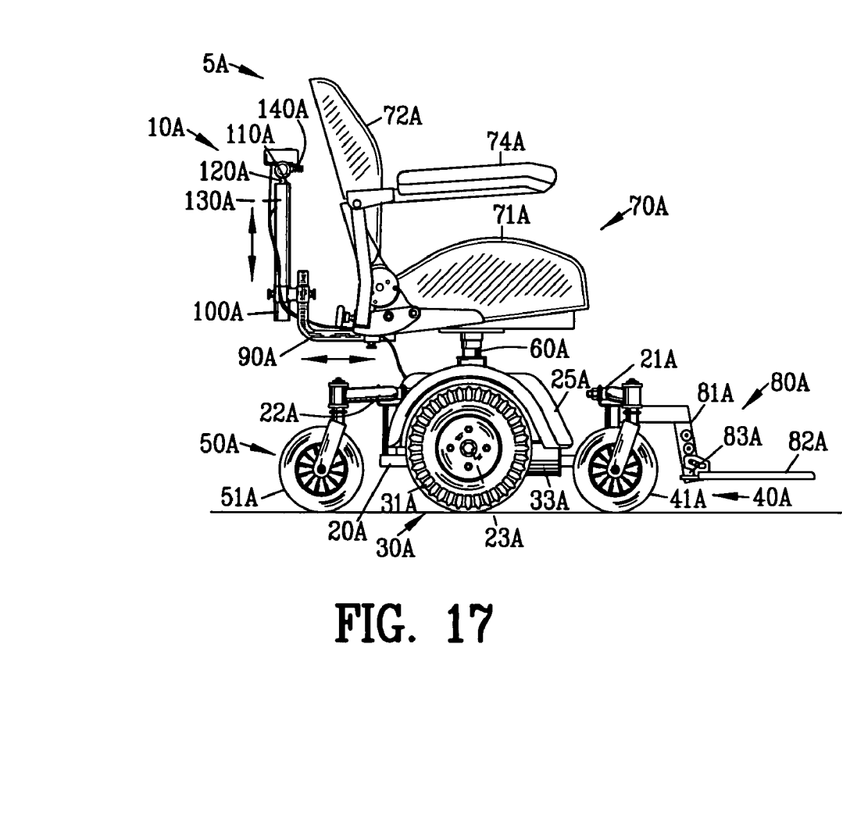
FIG. 17 is a side view of a second embodiment of the personal mobility vehicle incorporating the electronic steering assembly with independent drive controls for a dual motor vehicle for control by an attendant to the personal mobility vehicle.
Figure 18:
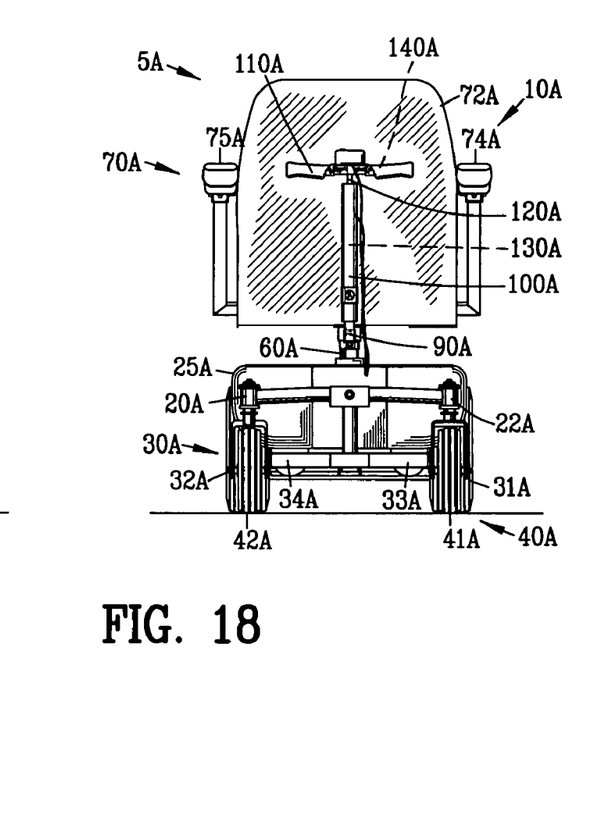
FIG. 18 is a rear view of FIG. 17.

FIGS. 17 and 18 depict a second embodiment of the present invention illustrating a personal mobility vehicle 5A incorporating the electronic steering assembly with independent drive controls for a dual motor vehicle 10A for operation by an attendant (not shown) to the personal mobility vehicle 5A. In this embodiment, the base 90A is adapted to be mounted behind a seat assembly 70A of the personal mobility vehicle 5A for enabling an attendant to control the personal mobility vehicle 5A.

Figure 19:
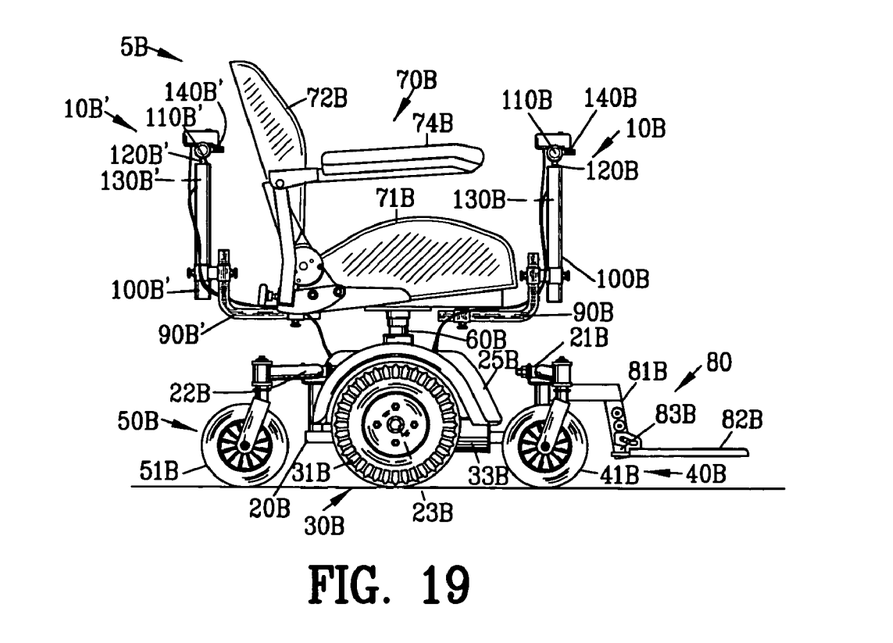
FIG. 19 is a side view of a third embodiment of a personal mobility vehicle incorporating plural electronic steering assemblies with independent drive controls for a dual motor vehicles for control by both an occupant or an attendant to the personal mobility vehicle.
Figure 20:
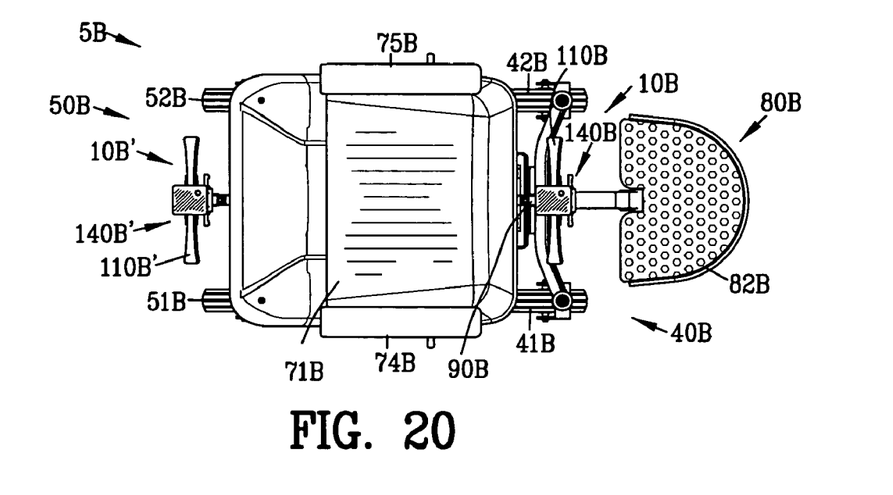
FIG. 20 is a top view of FIG. 19.

FIGS. 19 and 20 depict a third embodiment of the present invention illustrating a personal mobility vehicle 5B incorporating the plural electronic steering assembly with independent drive controls for a dual motor vehicle 10B and 10B' for control by both an occupant (not shown) of the personal mobility vehicle 5B or by an attendant (not shown) to the personal mobility vehicle 5B. The base 90B is adapted to be mounted to position the handlebar 100B in front of the seat assembly 70B of the personal mobility 5B vehicle for enabling an occupant (not shown) to control the personal mobility vehicle 5B. The base 90B' is adapted to be mounted to position the handlebar 100B' behind the seat assembly 70B of the personal mobility 5B vehicle for enabling an attendant (not shown) to control the personal mobility vehicle 5B.

Figure 21:
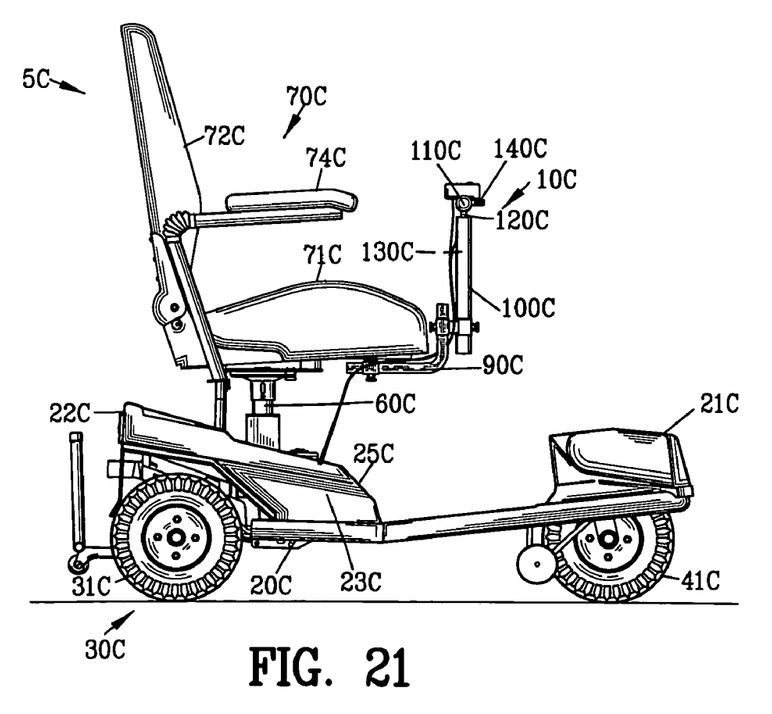
FIG. 21 is a side view of a scooter type personal mobility vehicle incorporating the electronic steering assembly with independent drive controls for a dual motor vehicle of the present invention.
Figure 22:
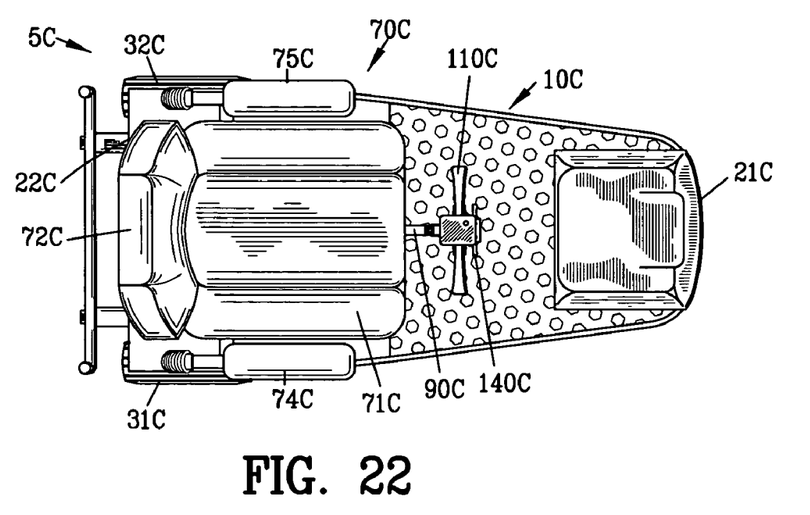
FIG. 22 is a top view of FIG. 18.

FIGS. 21 and 22 depict a fourth embodiment of the present invention illustrating a scooter type personal mobility vehicle with dual motors 5C incorporating the electronic steering assembly with independent drive controls for a dual motor vehicle 10C of the present invention. The traditional pivoted front wheel mechanically controlled by a handlebar (not shown) has been replaced by a front caster wheel assembly 40C comprising a central caster wheel 41C. In should be appreciated by those skilled in the art that this fourth embodiment of the present invention may incorporate plural front caster wheels.

The base 90C is adapted to be mounted to position the handlebar 100C in front of the seat assembly 70C of the personal mobility 5C vehicle for enabling an occupant (not shown) to control the personal mobility vehicle 5C.

It should be appreciated by those skilled in the art that a personal mobility vehicle may be fashioned to provide the attendant controlled personal mobility vehicle 5 as shown in FIGS. 1-11 as well as the occupant controlled personal mobility vehicle 5B as shown in FIGS. 12-19.

In use, the improved steering and control assembly 10, electronically steers and turns the dual motor vehicle 5 with minimal effort unlike a scooter type personal mobility vehicle which requires upper body strength to mechanically steer a single or plural wheels.

As you turn the handlebar 10, the only resistance is an inside handlebar tube 120 turning within an outside tube 102. Since the inside tube is mounted on a bearing (not shown) within the outer tube 102, little to no force is required to steer and turn the dual motor vehicle 5.

The benefits to positioning the steering assembly 10 in the center of the vehicle are: proximity to the rider; and the steering controls are within the rider's line of sight so doorways and hallways are easier to navigate and can be "lined-up" by the handelbar's center position. The center-mounted steering assembly position is similar to a bicycle's handlebar or automobile's steering wheel position.

When we first learn to walk, ride a bike, or drive a car, the human brain processes the sensory feedback for balance and coordination in the cerebellum according to the National Institute on Aging, "Inside the Human Brain: The Main Players", last update Nov. 25, 2008. In addition, according to the study, the cerebellum's work allows us to move smoothly, maintain our balance, and turn around without even thinking about it. It also is involved with motor learning and remembering how to do things like drive a car.

Unlike a joystick which controls up to seven different functions and sits outside of a powerchair user's line-of-sight, the present invention's steering assembly can be operated without even thinking about it, just like steering a car or a bicycle.

To drive the dual motor vehicle, you can first turn the handlebar to the steer dual motor vehicle into the direction you wish to travel. On a mid-wheel drive powerchair, you turn in place so you can move without covering new space or bumping into anything.

You can operate the steering and control assembly with just one hand or both hands. The right side or left side control levers for speed, braking and forward/reverse can also be operated with just one or two fingers from either side.

The other benefit of the sturdy center handlebar structure is the safety it provides as a passive-restraint system and pedestrian accidental contact protection. In busy pedestrian traffic, powerchairs and wheelchairs are hard to see and, consequently, riders are rightfully fearful of personal injury or someone being hurt by falling into them. The steering assembly increases rider comfort because the handlebar can be grasped as support and provides added protection for themselves and others in crowds.

Unlike joystick controls on conventional powerchairs, the new steering and control system is less prone to accidental engagement or damage. Conversely, the diaphragm of a joystick is easy to damage and the joystick accidentally engage when it is run into or under a table on a desk. Also, the steering and control assembly is compact and portable, so it can be easily removed from the powerchair to provide the user the comfort of traveling by airplane or motor vehicle while in possession of their critical powerchair controls.

The portable plug-and-play connector 146 (not shown), similar to a wireless microphone jack connector, allows the steering and control assembly to be docked into multiple positions in front of the powerchair or for an attendant behind the powerchair. In crowds such as malls or sporting events many powerchair users benefit from a caregiver or attendant who has a better view of oncoming pedestrians to operate their vehicle.

To drive the dual motor vehicle after turning it into the direction one wants to travel, simply depress the forward speed control lever 141 gradually to move. The more it is depressed, the faster you go up to your pre-set top speed setting. This control is intuitive and easy to learn and stops the vehicle automatically when a spring returns it to neutral position on release. Since many new powerchair users previously operated a similar scooter-type driving control, a bicycle, or an automobile, the learning curve is virtually eliminated.

Theoretically, because the human brain controls activities like thinking, planning, problem solving, as well as attention and movement in the frontal lobe of the cerebral cortex (according to the National Institute on Aging, "Inside the Human Brain: The Main Players", last update Nov. 25, 2008), the command functions for regulating speed, braking and forward/reverse controls take place in a different part of the brain from the cerebellum where steering commands are processed. This theory may explain why separating the functions of steering and turning from speed, braking and forward/reverse, the present invention is easier to use and more intuitive than joystick controls.

If you want to drive the present invention in reverse one may choose to use the reverse speed control lever 142 or simply turn the vehicle around in place by turning the handlebar. As an alternative, for users with only the use of one hand, reverse can also be achieved by pushing the forward speed control lever 141 forward.

The drive controls also provide automatic three phase braking by releasing the speed control lever 141 or 142. A spring returns it to center and begins stopping the vehicle when the interface module 145 carries the signal to the dual motor controller 150. Through the dual motor controller 150 the motors reverse current to the batteries for regenerative braking which provides a soft stop. Dynamic braking occurs next to completely stop the vehicle and then parking brakes on each motor 33 and 34 secure the vehicle even on inclines.

The steering and control assembly includes a dashboard to house the interface command module 145; the sensor 143 for speed, braking and forward/reverse; and standard and optional switches and gauges for the additional operations of the dual motor vehicle.

Before one steers or operates the dual motor vehicle 5, it is required to turn the vehicle on by depressing an on-off switch on the dashboard. Next, selecting the top speed called for by your riding environment, one can select from up to 5 top speeds. Typically, inside use calls for lower top speed settings while outside use calls for higher settings. An LED indicator measures and monitors battery capacity as well as provides trouble-shooting fault monitoring via flash codes.

Optional controls for lights can be added. Other accessories such as elevating leg rests, seat lift actuators and other peripheral devices can be installed and controlled through the dual motor controller 150 and switches on the dashboard or through the use of the speed control levers 141 and 142.

The steering and control assembly 10 is available in various sizes, shapes, configurations, materials, colors and fashionable designs. It can be hard wired or plug and play for portability and attendant optional control. It can be retracted below the seat level and raised with little effort into riding position. Alternatively, it can be mounted on a swivel off an armrest and be lowered and locked into place or it can be small in size to mount at the end of an armrest.

The drive controls 140 can be separated from the steering assembly 10 and each can be mounted at the end of an armrest, or in another position desired by the dual motor vehicle operator.

The present invention is suitable for installation on new powerchairs as well as replacements for joysticks on existing powerchairs. As powerchair users age and/or their disability worsens often the result is the loss of fine motor skills required to operate a joystick. The subject steering and control assembly 10 provides a more intuitive and easier to use alternative operating system so many more powerchair users can maintain their independence despite the onset of age or disability.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An electronic steering assembly with independent drive controls for a dual motor vehicle, the dual motor vehicle having a first and a second motor for driving a first and a second drive wheel and including a seat for accommodating an occupant, comprising:
   a base mounting directly secured to the seat of the dual motor vehicle;
   a base extending between a first and a second end;
   said first end of said base being removeably secured to said base mounting;
   a handlebar rotatably mounted to said second end of said base;
   an independent drive control mounted to said handlebar;
   a first sensor for sensing the rotational position of said handlebar relative to said base;
   a second sensor for sensing the rotational position of the independent drive control relative to said handlebar; and
   a controller interposed between said first and second sensors and the first and second motors for powering the first motor relative to the second motor in accordance with the rotational position of said handlebars for steering the dual motor vehicle and the rotational position of said independent drive control for operating the dual motor vehicle.

2. An electronic steering assembly with independent drive controls for a dual motor vehicle as set forth in claim 1, wherein the dual motor vehicle is a powerchair type personal mobility vehicle.

3. An electronic steering assembly with independent drive controls for a dual motor vehicle as set forth in claim 1, wherein the dual motor vehicle is a scooter type personal mobility vehicle.

4. A steering assembly for a dual motor vehicle as set forth in claim 1, including an adjuster section for adjusting the position of said handlebar relative to said base mounting of the dual motor vehicle.

5. A steering assembly for a dual motor vehicle as set forth in claim 1, wherein said first sensor comprises an electrical stator and an electrical rotor with said electrical rotor being rotatable relative to said electrical stator; and
   one of said electrical stator and said electrical rotor being fixed relative to said base with the other of said electrical stator and said electrical rotor being fixed relative to said handlebar for providing an electrical signal indicative of the rotational position of said handlebar relative to said base.

6. A steering assembly for a dual motor vehicle as set forth in claim 1, wherein said first sensor is selected from the group consisting of a potentiometer rotational sensor, a permanent magnetic rotational sensor, a variable inductance rotational sensor, a resolver rotational sensor, a magnetic rotational sensor, a capacitive rotational sensor and a Hall effect rotational sensor.

7. A steering assembly for a dual motor vehicle as set forth in claim 1, wherein said first sensor comprises a potentiometer stator and a potentiometer rotor with said potentiometer rotor being rotatable relative to said potentiometer stator; and
   one of said potentiometer stator and said potentiometer rotor being fixed relative to said base with the other of said potentiometer stator and said potentiometer rotor being fixed relative to said handlebar for providing an electrical signal indicative of the rotational position of said handlebar relative to said base.

8. A steering assembly for a dual motor vehicle as set forth in claim 1 wherein said first and second motors are electric motors.

9. An electronic steering assembly with independent drive controls for a dual motor vehicle, the dual motor vehicle having a first and a second motor for driving a first and a second drive wheel and including a seat for accommodating an occupant, comprising:
   a base mounting directly secured to one of a front and a rear portion of the seat of the dual motor vehicle;
   a base extending between a first and a second end;
   said first end of said base being removeably secured to said base mounting;
   a handlebar rotatably mounted to said second end of said base;
   an independent drive control mounted to said handlebar;
   a first sensor for sensing the rotational position of said handlebar relative to said base;
   a second sensor for sensing the rotational position of the independent drive control relative to said handlebar; and
   a controller interposed between said first and second sensors and the first and second motors for powering the first motor relative to the second motor in accordance with the rotational position of said handlebars for steering the dual motor vehicle and the rotational position of said independent drive control for operating the dual motor vehicle.

10. An electronic steering assembly with independent drive controls for a dual motor vehicle, the dual motor vehicle having a first and a second motor for driving a first and a second drive wheel and including a seat for accommodating an occupant, comprising:
    a base mounting directly secured to a front portion of the seat of the dual motor vehicle;
    a base extending between a first and a second end;
    said first end of said base being removeably secured to said base mounting;
    a handlebar rotatably mounted to said second end of said base;
    an independent drive control mounted to said handlebar;
    a first sensor for sensing the rotational position of said handlebar relative to said base;
    a second sensor for sensing the rotational position of the independent drive control relative to said handlebar; and
    a controller interposed between said first and second sensors and the first and second motors for powering the first motor relative to the second motor in accordance with the rotational position of said handlebars for steering the dual motor vehicle and the rotational position of said independent drive control for operating the dual motor vehicle.

11. An electronic steering assembly with independent drive controls for a dual motor vehicle, the dual motor vehicle having a first and a second motor for driving a first and a second drive wheel and including a seat for accommodating an occupant, comprising:

a base mounting directly secured to a rear portion of the seat of the dual motor vehicle;

a base extending between a first and a second end;

said first end of said base being removeably secured to said base mounting;

a handlebar rotatably mounted to said second end of said base;

an independent drive control mounted to said handlebar;

a first sensor for sensing the rotational position of said handlebar relative to said base;

a second sensor for sensing the rotational position of the independent drive control relative to said handlebar; and a controller interposed between said first and second sensors and the first and second motors for powering the first motor relative to the second motor in accordance with the rotational position of said handlebars for steering the dual motor vehicle and the rotational position of said independent drive control for operating the dual motor vehicle.

\* \* \* \* \*